United States Patent [19]

Lowery

[11] Patent Number: 4,497,521

[45] Date of Patent: Feb. 5, 1985

[54] BALL-LIKE WHEEL WITH SOCKETS FOR AXLE

[76] Inventor: Michael B. Lowery, 228 Preston New Rd., Blackpool, England

[21] Appl. No.: 392,517

[22] Filed: Jun. 28, 1982

[51] Int. Cl.[3] .......................... B60B 5/02; B60B 27/02
[52] U.S. Cl. ..................................... 301/106; 301/5.7; 301/124 R; 301/63 PW; 384/544
[58] Field of Search ............. 301/5.3, 5.7, 106, 124 R, 301/125, 63 PW, 1, 7; 308/191, 210; 46/201, 221; 280/47.31

[56] References Cited

U.S. PATENT DOCUMENTS

| 3,625,575 | 12/1971 | Darnell ........................... 308/191 X |
| 3,722,968 | 3/1973 | Bomberger ........................ 308/191 |
| 3,933,397 | 1/1976 | Hood ................................ 301/5.7 X |
| 4,034,995 | 7/1977 | Forward et al. ................... 301/5.7 X |
| 4,058,344 | 11/1977 | Dyson ........................ 301/63 PW X |
| 4,090,283 | 3/1978 | Wolley ............................. 301/5.7 X |
| 4,174,871 | 11/1979 | Brannan ............................ 301/7 X |

FOREIGN PATENT DOCUMENTS 1448603  9/1976  United Kingdom .

Primary Examiner—David A. Scherbel
Attorney, Agent, or Firm—Fleit, Jacobson, Cohn & Price

[57] ABSTRACT

The invention relates to a ground engaging member for use in hand or gravity powered vehicles such as hand-trucks, trolleys, push-chairs, bicycles, roller-skates, bob-cats, grass-skis and amphibious craft and the like, made of a moulded plastics ball. Incorporated in the ball-like member are two diametrically opposite sockets each accommodating a bearing. Each bearing is arranged to accomodate a vehicle axle assembly. The bearing housing and the socket are correspondingly tapered inwardly so that the bearing housing may be pushed into the socket until it is gripped fully by the walls of the socket, and the socket depth is arranged to be greater than the length of the bearing housing.

7 Claims, 3 Drawing Figures

U.S. Patent   Feb. 5, 1985   4,497,521
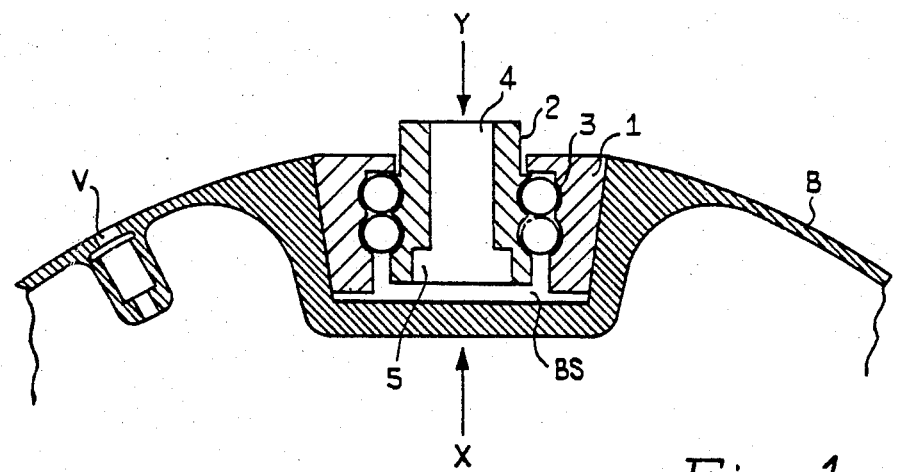
_Fig 1_
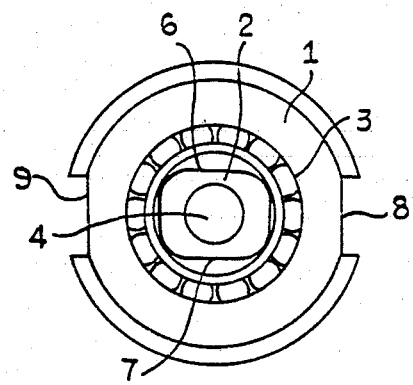
_Fig. 2_
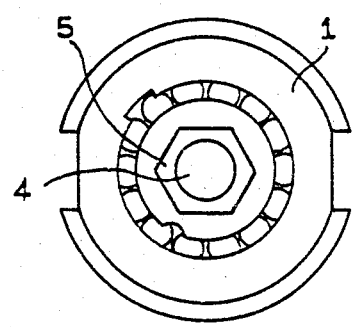
_Fig. 3_

BALL-LIKE WHEEL WITH SOCKETS FOR AXLE

The present invention relates to ball-like ground engaging members for use in human, gravity or low powered vehicles such as hand-trucks, trolleys, push-chairs, bicycles, roller skates, bobcats grass-skis and amphibious craft and the like.

It has been found that conventional wheeled vehicles of the above type suffer from severe restrictions in that they are unstable and are difficult to maneuver when operating over broken or uneven ground. The incorporation of ball-like ground engaging members substantially enchances the stability of such vehicles, particularly when operating over uneven surfaces.

The ball-like members are usually constructed in one piece, of moulded plastics material, with a pair of sockets, located diametrically opposite each other, for the accommodation of vehicle axle assemblies. The ball-like members may be constructed in a variety of manners and may even be of the inflatable type to provide air suspension for the vehicle.

A particular problem encountered during the manufacture of ball-like ground engaging members for such vehicles is the relatively large tolerance variations experienced in the formation of the axle accommodating socket.

It is an aim of the present invention to provide an improved ball-like ground engaging arrangement for use in human, gravity or low powered vehicles.

According to the invention there is provided a ground engaging arrangement for use in vehicles of the kind specified comprising a ball-like member of plastics material moulded in one piece and including diametrically opposite sockets accommodating in each socket a bearing characterised in that the bearing housing and the socket are correspondingly tapered inwardly so that the bearing housing may be pushed into the socket until it is gripped fully by the walls of the socket, and that the socket depth is arranged to be greater than the length of the bearing housing.

This arrangement of tapered bearing housing and correspondingly tapered socket walls in the ball member has the particular advantage of ensuring that the bearing housing, when pushed into the socket in the ball, is gripped on all sides of the housing regardless of the size of the socket within the tolerance of manufacture. Any variation in tolerance will be taken up by the bearing housing being located further into the socket or protruding slightly from the socket.

It has been found that the optimal taper for bearing and socket is of the order of 7° with a maximum of 15°.

The use of a plug-type arrangement for accommodating the bearing in the ball socket, allows brakes of the disc type or drive sprockets to be bolted onto the bearing shaft or the bearing shell as the case may be.

The bearing is provided at one end of the shaft with a captive nut recess accommodating a nut for securing an axle stub of the vehicle and at the other end of the shaft spanner flats may be provided.

The bearing housing shell may also include two or more key slots adapted to co-operate with corresponding keyways in the ball member socket, to prevent rotation of the bearing housing in the socket.

The bearings operate upon the ball bearing principle having two bearing races and may accommodate a free-wheel arrangement.

The invention will be described with reference to one embodiment as shown in the accompanying drawings. Of the drawings:

FIG. 1 is a sectional view of the ball-like member showing the mounting of one of the bearings in the socket in the ball-like member, FIG. 2 shows the end-view of the bearing when viewed from direction Y in FIG. 1 while FIG. 3 shows the end-view of the bearing when viewed from direction X in FIG. 1.

As mentioned previously the invention is concerned with the provision of ball-like ground engaging arrangements for use in human, gravity or low powered vehicles such as hand trucks, trolleys, pushchairs, bicycles, roller skates, grass skis, bobcats and amphibious craft and the like. The above list is intended to be explanatory only and is, of course, not intended to be exhaustive of the applications of the vehicles to which the ball-like ground engaging member of the invention may be applied; and hereafter reference to vehicles of the kind specified is to be construed as relating to such vehicles.

Referring now to the drawings the ground engaging ball B is moulded in one piece using rotational moulding or blow moulding techniques and employing semi-rigid plastics material, for example low density polyethylene. The ball may be moulded with suitable tread ribs on its outer surface together with a valve V which is for use in inflating the ball if required. It has been discovered that a suitable ball pressure to provide sufficient air suspension for the vehicle is of the order of about six pounds per square inch. Pressures in excess of this tend to cause the ball to distort when used in direct sunlight or temperatures in excess of 20° C. The ball member B is also moulded with two diametrically opposite sockets BS in it, adapted to accommodate axle bearings. Only one bearing 1 is shown in FIG. 1 of the drawings but it will be realised that the ball member accommodates two such bearings 1 of substantially similar construction.

The bearings, which may be made of nylon, each comprise a tapered housing 1 accommodating a rotating spindle 2 running on a double ball race 3. The housing 1 is inwardly tapered when viewed from point Y at an angle of preferably 7° as is the socket in the ball B. It has been found that a taper of less than 5½° does not provide the advantages of the invention whereas a taper in excess of 15° similarly is unworkable. The slope of the taper is arranged such that the housing is gripped around its periphery and over substantially its full length when accommodated within the socket BS. The slope used for the taper is such that it will not work against the insertion of the bearing into the socket.

The bearing shaft 2 is formed with a central bore 4 which is used to accommodate an axle of the vehicle using the ball-like member and the shaft is provided with a captive nut enclosure 5 at its inner end, to secure the axle to the shaft, and, at its outer end, spanner flats 6 and 7.

To prevent rotation of the bearing in its socket the bearing housing incorporates at least two key slots 8 and 9 adapted to co-operate with corresponding keyways (not shown) in the socket BS.

The arrangement of the ball member and bearing allows the outer surface of the bearing housing to be used to carry disc brakes and/or a low power drive sprocket and of course the ball bearing races may be operated in accordance with free wheel arrangements.

The bearings have been defined above as being made of nylon, however, it will be realised by one skilled in the art that other suitable thermo-setting plastics materials could be used. In addition the bearing housings incorporate key slots which co-operate with keyways in the socket however the sockets could be arranged to be an interference fit with the sockets by making the bearing of harder material than the ball member and incorporating rib like cutting projections on the outer surface of the bearing housing.

In operation the bearing is pushed into the socket of the ball member until it is gripped tightly by the socket walls. The depth of the socket is arranged such that the bearing housing is tightly gripped before its inner end reaches the bottom of the socket. This arrangement ensures that any manufacturing tolerances of the socket dimensions or distortion tolerances of the socket due to inflation of ball member are taken up by the plug effect of inserting the tapered bearing housing into the socket.

The above description has been of one embodiment only and is not intended to be limiting to the scope of the invention. Alternative arrangements will readily be appreciated by those skilled in the art, for example the bearing may be splined into the socket.

What I claim is:

1. A ball-like ground engaging apparatus for use in human, gravity or low powered vehicles, said apparatus comprising a ball-like member of plastic material moulded in one piece and including diametrically opposite inwardly tapering sockets accommodating a bearing in each socket, said bearing including a bearing housing and a spindle defining a hollow shaft, said bearing housing being correspondingly tapered inwardly and the bearing housing being received in the socket and gripped fully by the walls of the socket, the socket depth is selected to be greater than the length of the bearing housing and said hollow shaft having a captive nut recess at its innermost end adapted to accommodate a nut for securing an axle stub in said hollow shaft.

2. A ball-like ground engaging apparatus according to claim 1, wherein the rotatable spindle is provided with spanner flats at its periphery.

3. A ball-like ground engaging apparatus according to claim 1, wherein the bearing housing is adapted to co-operate with the socket in such manner as to prevent rotation of the housing in the socket.

4. A ball-like ground engaging apparatus according to claim 3, wherein the bearing housing includes at least two key slots adapted to co-operate with corresponding keyways in the socket to prevent rotation of the bearing housing in the socket.

5. A ball-like ground engaging apparatus according to claim 1, wherein the bearing housing is adapted to co-operate with the socket in such manner as to prevent rotation of the housing in the socket.

6. A ball-like ground engaging apparatus according to claim 5, wherein the bearing housing includes at least two key slots adapted to co-operate with corresponding keyways in the socket to prevent rotation of the bearing housing in the socket.

7. A ball-like ground engaging apparatus according to claim 1, wherein the taper of the bearing housing and the socket is defined by the range of 7° to 15°.

* * * * *